United States Patent Office.

CABELL WHITEHEAD, OF WASHINGTON, DISTRICT OF COLUMBIA.

PROCESS OF TREATING MIXTURES CONTAINING SULPHIDES OF PRECIOUS METALS AND COPPER.

SPECIFICATION forming part of Letters Patent No. 483,972, dated October 4, 1892.

Application filed March 19, 1892. Serial No. 425,619. (No specimens.)

*To all whom it may concern:*

Be it known that I, CABELL WHITEHEAD, a citizen of the United States, residing at Washington, in the District of Columbia, have invented certain new and useful Improvements in Processes of Treating Mixtures Containing Sulphides of the Precious Metals and of Copper; and I do hereby declare the following to be a full, clear, and exact description of the invention, such as will enable others skilled in the art to which it appertains to make and use the same.

In the lixiviation process of treating ores of the precious metals the ores are subjected to the action of solvents which extract the precious metals and then the precious metals are recovered from these solutions. The most common way to recover the precious metals is to precipitate them as sulphides, in which case they will also be accompanied by the sulphides of other metals, particularly copper. The sulphides produced by different lixiviation works vary very much in composition, according to the character of ore treated and the particular process of lixiviation employed. In general they consist of a mixture of sulphides of gold, silver, copper, and lead with free sulphur, and contain various impurities in small amounts. In many cases the amount of lead present is small, and it may be altogether absent. In general they may be said to vary as follows: gold, trace to one per cent.; silver, five to seventy per cent.; copper, five to twenty per cent.; lead, trace to fifteen per cent. The treatment of these sulphides to separate and recover the precious metals involves serious difficulties and many processes have been proposed for the purpose. Of the processes proposed only one is now in use. This consists in melting the sulphides with lead on a cupel-hearth and cupeling the lead off. This process is expensive and there is much loss on account of the high heat required due to the presence of copper. The chief difficulty in treating these sulphides lies in the presence of copper, which, as is well known, is a hard metal to separate from the precious metals. The novelty of my process therefore consists in separating the copper from the sulphides of the precious metals by a very simple wet process, which affords no chance of loss of the precious metals and which also recovers the copper in a useful form.

In carrying out my process the sulphides are treated with a solution of a soluble salt of silver, preferably the sulphate. There is then an interchange of metals. The copper of the sulphides goes into solution, while the silver of the soluble salt is precipitated as sulphide. The reaction will be hastened by the application of heat. By a very simple calculation just the right amount of silver solution can be added, so as to take all of the copper into solution and precipitate all of the silver from the solution used. When the reaction is completed, the solution containing the copper is separated from the residue and can be utilized in a variety of ways. The copper can be precipitated from the solution; but it will generally be better to recover it by evaporating the solution and crystallizing out the copper-salt—as, for instance, the sulphate when sulphate of silver is used. The residue from this treatment will consist of the sulphides of the precious metals from the sulphides under treatment and the sulphide of silver resulting from the reaction, together with the insoluble impurities of the original sulphides. The treatment of these residues may vary. They may be dried and then roasted at a low temperature—a faint red is sufficient—to convert the precious-metal sulphides into metallic gold and silver. The spongy metals may then be put into an iron kettle with strong sulphuric acid and heated. By this treatment the silver will be dissolved as sulphate, leaving the gold behind. The solution of sulphate of silver can then be separated from the residue, and the silver can be reduced with metallic copper, sulphate of iron, or any other convenient method, and recovered as fine silver. The residue remaining after the solution of the silver in sulphuric acid may be melted to recover the gold as fine metal. In some cases it will be better to melt the spongy metal and cast it into bars before treatment with strong sulphuric acid. A great advantage of using the sulphuric-acid-parting process for the treatment of the metals resulting from the roasting of the purified sulphides is that it furnishes the solution of sulphate of silver required for the treatment of the original sulphides. For this purpose a portion of the sulphate of silver solution is not precipitated, but is reserved for treating a fresh lot of sulphides. Under certain conditions, particularly when the sulphides contain lead, it may be preferable to reduce the purified sulphides, free from copper to an alloy of gold, silver, and lead, which can be treated by any of the well-known methods for the separation of these metals. Even in this case, however, it will be desirable to treat a portion of the purified sulphides for the production of sulphate of silver to be used in the purifying process.

To more fully explain my process, I will describe it as applied to one variety of sulphides with which I am most familiar. This sulphide was produced by the Russell process of lixiviation, and is generally spoken of as "Russell sulphides." They contain a little gold, about thirty per cent. of silver, twenty per cent. of copper, and small amounts of impurities. These Russell sulphides are placed in a lead-lined tank with a suitable quantity of water, and solution of sulphate of silver added in the proportion of about twelve hundred pounds of contained silver for one ton of sulphides. The whole is then heated by a jet of steam. When the reaction is completed, the solution of sulphate of copper is filtered off and the sulphate of copper crystallized out. The residue, after washing, is dried and roasted at a low temperature to reduce the silver to the metallic state and burn off the free sulphur. It is then put into a cast-iron pot. Strong sulphuric acid is then added in the proportion of twice the weight of silver and heat applied until the silver is dissolved. The solution of sulphate of silver is separated from the residue, consisting mainly of metallic gold, in the usual way. A portion of the solution is reserved for treating a new lot of Russell sulphides, and the balance is run into precipitating-tanks containing metallic copper, when the silver is reduced to the metallic state and sulphate of copper goes into solution. The silver precipitated from the solution is dried and melted to fine metal, while the solution is evaporated to recover the sulphate of copper. The residue from the sulphuric-acid treatment is melted with sand and niter to fine gold.

The advantages of my process are that the copper is separated from the sulphides and recovered in a useful form, and as a consequence of the removal of the copper all the subsequent operations may be carried on at such low temperatures that all danger of loss by volatilization is avoided.

When the process is carried on in connection with works operating the Russell lixiviation process, the recovery of the copper as sulphate will be especially valuable, since the Russell process requires the use of large amounts of sulphate of copper.

What I claim as new and valuable is—

1. The process of treating a mixture containing sulphides of gold, silver, and copper, which consists in separating the copper and leaving the gold and silver in their original condition, substantially as described.

2. The process of converting the copper contained in a mixture of sulphides of copper and of the precious metals into a soluble salt and separating it from the precious metals and forming sulphide of silver, which consists in treating the mixed sulphides with solution of a salt of silver and separating the solution from the residue and precipitate, substantially as described.

3. The process of treating a mixture containing sulphides of the precious metals and of copper, which consists in mixing the sulphides with solution of a salt of silver, whereby a soluble salt of copper is formed and sulphide of silver is precipitated, separating the solution containing the copper from the residue containing the precious metals, roasting this residue to reduce the precious metals to the metallic state, treating the reduced metals with hot sulphuric acid to dissolve the silver, separating the silver solution from the residue, and melting the final residue, substantially as described.

In testimony whereof I affix my signature in presence of two witnesses.

CABELL WHITEHEAD.

Witnesses:
CHAS. H. MILLER,
W. F. BOWEN.